(12) United States Patent
Manne

(10) Patent No.: US 12,367,119 B2
(45) Date of Patent: Jul. 22, 2025

(54) SYSTEMS AND METHODS FOR DISABLING FAULTY CORES USING PROXY VIRTUAL MACHINES

(71) Applicant: Advanced Micro Devices, Inc., Santa Clara, CA (US)

(72) Inventor: Srilatha Manne, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 93 days.

(21) Appl. No.: 18/502,941

(22) Filed: Nov. 6, 2023

(65) Prior Publication Data

US 2024/0152434 A1 May 9, 2024

Related U.S. Application Data

(60) Provisional application No. 63/422,841, filed on Nov. 4, 2022.

(51) Int. Cl.
*G06F 11/20* (2006.01)
(52) U.S. Cl.
CPC ................ *G06F 11/2023* (2013.01)

(58) Field of Classification Search
CPC .... G06F 11/20; G06F 11/202; G06F 11/2023; G06F 11/2028; G06F 11/2035; G06F 11/0724; G06F 11/0793; G06F 11/2242; G06F 1/3287; G06F 9/45558
See application file for complete search history.

(56) References Cited

U.S. PATENT DOCUMENTS

| | | | |
|---|---|---|---|
| 11,263,083 B1* | 3/2022 | Lu | G06F 11/1471 |
| 2014/0164827 A1* | 6/2014 | Swanson | G06F 11/2043 714/10 |
| 2018/0181474 A1* | 6/2018 | DeHaemer | G06F 11/2028 |
| 2018/0285164 A1* | 10/2018 | Hu | G06F 9/5077 |
| 2021/0049029 A1* | 2/2021 | Kumble | G06F 9/45558 |
| 2021/0191748 A1* | 6/2021 | Ito | G06F 9/45558 |

* cited by examiner

*Primary Examiner* — Michael Maskulinski
(74) *Attorney, Agent, or Firm* — Greenberg Traurig, LLP

(57) ABSTRACT

A device for disabling faulty cores using proxy virtual machines includes a processor, a faulty core, and a physical memory. The processor is responsible for executing a hypervisor that is configured to assign a proxy virtual machine to the faulty core. The assigned proxy virtual machine also includes a minimal workload. Various other methods, systems, and computer-readable media are also disclosed.

20 Claims, 5 Drawing Sheets

SYSTEMS AND METHODS FOR DISABLING FAULTY CORES USING PROXY VIRTUAL MACHINES

CROSS REFERENCE TO RELATED APPLICATION

This application claims the benefit of U.S. Provisional Application No. 63/422,841, filed 4 Nov. 2022, the disclosures of which is incorporated, in its entirety, by this reference.

BACKGROUND

Data centers are often complex systems consisting of computing devices, where each can include a number of processors with many cores. A data center can allow customers to use the data center's hardware via virtual machines. In some cases, a virtual machine (VM) allocation software can be used to manage VM allocation across multiple computing devices. A hypervisor on each computing device can manage what cores are available for VM allocation. Each hypervisor can communicate its core availability to the VM allocation software to allow the VM allocation software to select between computing devices for VM scheduling and allocation. However, a computing device can include faulty cores prone to errors that, if used for VMs, can be problematic for large scale data center customers. Given the complexity of data centers, removing the entire computing device to address faulty cores can incur costly downtime, increase the total cost of ownership (TCO) of the data center, or otherwise be unfeasible.

BRIEF DESCRIPTION OF THE DRAWINGS

The accompanying drawings illustrate a number of example implementations and are a part of the specification. Together with the following description, these drawings demonstrate and explain various principles of the present disclosure.

Figure 1:
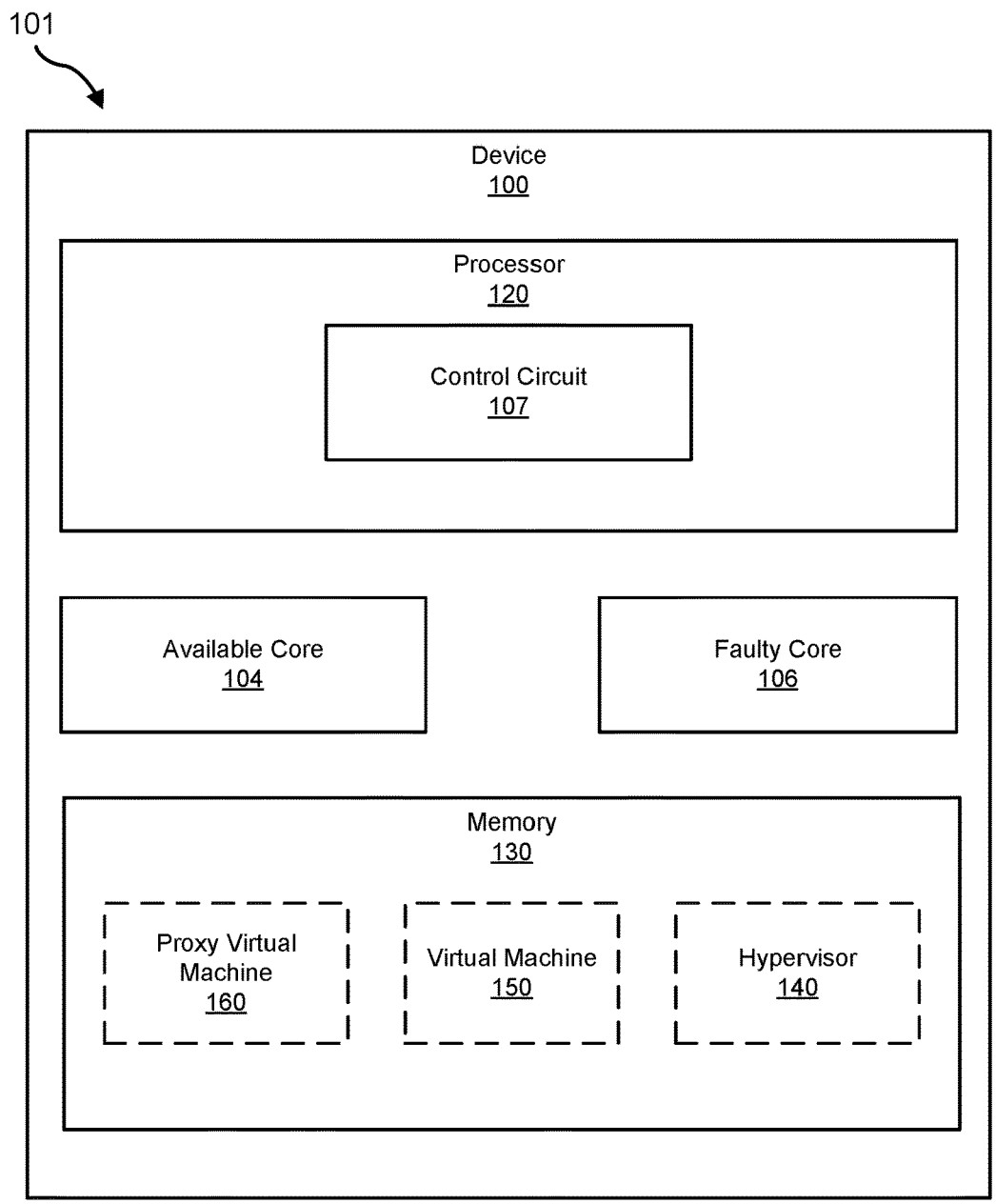
FIG. 1 is a block diagram of an exemplary multi-core device having a processor and a physical memory.

Throughout the drawings, identical reference characters and descriptions indicate similar, but not necessarily identical, elements. While the example implementations described herein are susceptible to various modifications and alternative forms, specific implementations have been shown by way of example in the drawings and will be described in detail herein. However, the example implementations described herein are not intended to be limited to the particular forms disclosed. Rather, the present disclosure covers all modifications, equivalents, and alternatives falling within the scope of the appended claims.

DETAILED DESCRIPTION OF EXAMPLE IMPLEMENTATIONS

The present disclosure is generally directed to systems and methods for disabling faulty cores using proxy virtual machines (VMs). As will be explained in greater detail below, implementations of the present disclosure isolate faulty cores from a VM scheduling and allocation scheme of a data center. A data center can include multiple computing devices, where each device includes a number of cores and a hypervisor. The hypervisor can be used to report a set of available cores to a high-level scheduler for virtual machine allocation. The high-level scheduler for a data center can manage VM allocation across one or more computing devices. The hypervisor, in addition, can make faulty cores invisible to the high-level scheduler for VM allocation by assigning proxy VMs to the faulty cores. This process of assigning proxy VMs to faulty cores can minimize the impact on other cores and can reduce the need for changes to the scheduling software as well as hardware. In addition to features presented herein, this process can enhance the functioning of computing devices by sustaining high levels of efficiency and improving resource management and allocation by reducing the usage of faulty cores. Additionally, this process can improve other technical fields, such as computer resource management in a data center by managing lifespans of computing devices and their physical processor cores. These lifespans can be further managed by balancing the distribution of processor usage and maintaining performance levels of physical processor cores.

In one implementation, a device for disabling faulty cores using proxy virtual machines can include a processor, a faulty core, and a physical memory including computer-executable instructions that, when executed by the processor, cause the processor to execute a hypervisor that is configured to assign a proxy virtual machine to the faulty core, wherein the proxy virtual machine includes a minimal workload.

In some examples, the hypervisor is configured to manage a set of available cores of the device that are available for assigning to virtual machines. In some examples, the hypervisor is configured to report the set of available cores of the device to a high-level scheduler. In some examples, the hypervisor is configured to assign the proxy virtual machine to the faulty core to remove the faulty core from the set of available cores. In some examples, the hypervisor is configured to terminate the proxy virtual machine to return the faulty core to the set of available cores.

In some examples, the hypervisor is configured to terminate the proxy virtual machine to balance a workload of the device across the set of available cores. In some examples, the hypervisor is configured to terminate the proxy virtual machine in response to receiving a faulty core status that indicates the faulty core is not faulty.

In some examples, the hypervisor is configured to provide a task to the proxy virtual machine to maintain an active state of the proxy virtual machine.

In some examples, the hypervisor assigns, to the proxy virtual machine, an affinity for the faulty core to bias an availability of the faulty core to the proxy virtual machine, via the affinity, when the proxy virtual machine enters a deep sleep state. In some examples, the hypervisor disables the deep sleep mode of the proxy virtual machine.

In one implementation, a system for disabling faulty cores using proxy virtual machines can include a computing device including a hypervisor that is configured to report a set of available cores to a high-level scheduler that is configured to manage virtual machine allocation on the computing device based on the reported set of available where: (i) the computing device includes a processor for executing the hypervisor and a faulty core and (ii) the hypervisor of the computing device is configured to assign a proxy virtual machine to the faulty core.

In some examples, the hypervisor of the computing device is configured to terminate the proxy virtual machine to (i) return the faulty core to the set of available cores and (ii) balance a workload of the computing device across the set of available cores. In some examples, the hypervisor of the computing device is further configured to terminate the proxy virtual machine in response to receiving a faulty core status that indicates the faulty core is not faulty.

In some examples, the hypervisor of the computing device is configured to prevent a deep sleep state of the proxy virtual machine by providing a task or disabling the deep sleep state of the proxy virtual machine.

In some examples, the hypervisor of the computing device is configured to assign, to the proxy virtual machine, an affinity for the faulty core from the set of available cores to bias an availability of the faulty core from the set of available cores to the proxy virtual machine when the proxy virtual machine enters a deep sleep state.

In some examples, the hypervisor of the computing device is configured to remove the faulty core from the set of available cores of the computing device by assigning the proxy virtual machine to the faulty core.

In one example, a computer-implemented method for disabling faulty cores using proxy virtual machines can include (i) providing, via a control circuit, a faulty core status to a hypervisor of a computing system to indicate that a core of the computing system is faulty, (ii) assigning, via the hypervisor, a proxy virtual machine to the faulty core in response to faulty core status, (iii) terminating the proxy virtual machine in response to an update to the faulty core status, and (iv) balancing a workload of the computing system across cores of the computing system. In some examples, the method further includes (1) assigning, to the proxy virtual machine, an affinity for the faulty core, wherein the affinity biases an availability of the faulty core to the proxy virtual machine and (2) reassigning, based on the affinity, the faulty core to the proxy virtual machine in response to the proxy virtual machine exiting the deep sleep state.

In some examples, the method includes disabling the deep sleep state of the proxy virtual machine via the hypervisor.

In some examples, the method further includes maintaining an active state of the proxy virtual machine, via the hypervisor, by providing a task to the proxy virtual machine comprising a minimal workload.

In some examples, the method further includes reporting, via the hypervisor, a set of available cores of the computing system to a high-level scheduler, where (i) the hypervisor assigns the proxy virtual machine to the faulty core to remove the set of available cores of the computing system, and (ii) the hypervisor terminates the proxy virtual machine to return the faulty core to the set of available cores.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-5, detailed descriptions of example systems and devices for disabling faulty cores using proxy virtual machines. Detailed descriptions of example systems and devices are provided in connection with FIGS. 1-4. Details of corresponding computer-implemented methods will also be provided in connection with FIG. 5.

FIG. 1 is a block diagram of an example system 101 that includes a device 100 for disabling faulty cores using proxy virtual machines. Device 100 corresponds to a computing device, such as a server, a desktop computer, a laptop computer, a tablet device, a mobile device, a smartphone, a wearable device, an augmented reality device, a virtual reality device, a network device, and/or an electronic device. As illustrated in FIG. 1, device 100 includes one or more memory devices, such as memory 130. Memory 130 generally represents any type or form of volatile or non-volatile storage device or medium capable of storing data and/or computer-readable instructions. Examples of memory 130 include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, and/or any other suitable storage memory.

As illustrated in FIG. 1, example device 100 can also include one or more physical processors, such as physical processor 120. Physical processor 120 generally represents any type or form of hardware-implemented processing unit capable of interpreting and/or executing computer-readable instructions. In one example, physical processor 120 can access and/or modifies data and/or instructions stored in memory 130. Examples of processor 120 include, without limitation, chiplets (e.g., smaller and in some examples more specialized processing units that can coordinate as a single chip), cores, microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, graphics processing units (GPUs), portions of one or more of the same, variations or combinations of one or more of the same, and/or any other suitable physical processor.

As further illustrated in FIG. 1, device 100 includes a control circuit 107 (e.g., as part of, integrated with, and/or otherwise interfaces with processor 120), an available core 104 and a faulty core 106 where each core corresponds to one or more physical processor cores. In some implementations, available core 104 and/or faulty core 106 can be integrated with and/or interface with processor 120. Memory 130 can load, store, and/or maintain a hypervisor 140, a virtual machine 150, and a proxy virtual machine 160 which can be executed by processor 120. Hypervisor 140 corresponds to a manager or monitor that can create and manage VMs, including virtual machine 150 and proxy virtual machine 160, by assigning or allocating VMs to one or more cores when creating the VMs, such as to a physical core (e.g., available core 104 and/or faulty core 106) of processor 120.

Hypervisor 140 can also manage the availability of cores, including available core 104 and faulty core 106, by continuously monitoring the usage of processor 120 and availability of each physical processor core in a host computing device (e.g., device 100). In some examples, hypervisor 140 can provide a report, to a high-level scheduler, of the physical processor cores available for VM allocation and confirms that the VMs requested by the high-level scheduler does not exceed the available resources on the host computing device.

Available core 104 corresponds to a physical core of device 100 that is available (e.g., powered on, and logically mapped to be available for assignment to a virtual machine by hypervisor 140). Faulty core 106 corresponds to another physical core of device 100 that is faulty (e.g., prone to error, powered on, and logically mapped to be available for assignment to a virtual machine by hypervisor 140). Virtual machine 150 can refer to an isolated application environment that virtualizes hardware as well as an operating system (OS). Proxy virtual machine 160 can refer to a variation of a virtual machine or a specific virtual machine configured to have a minimum workload or otherwise have a minimal impact on an overall performance of device 100.

Figure 2:
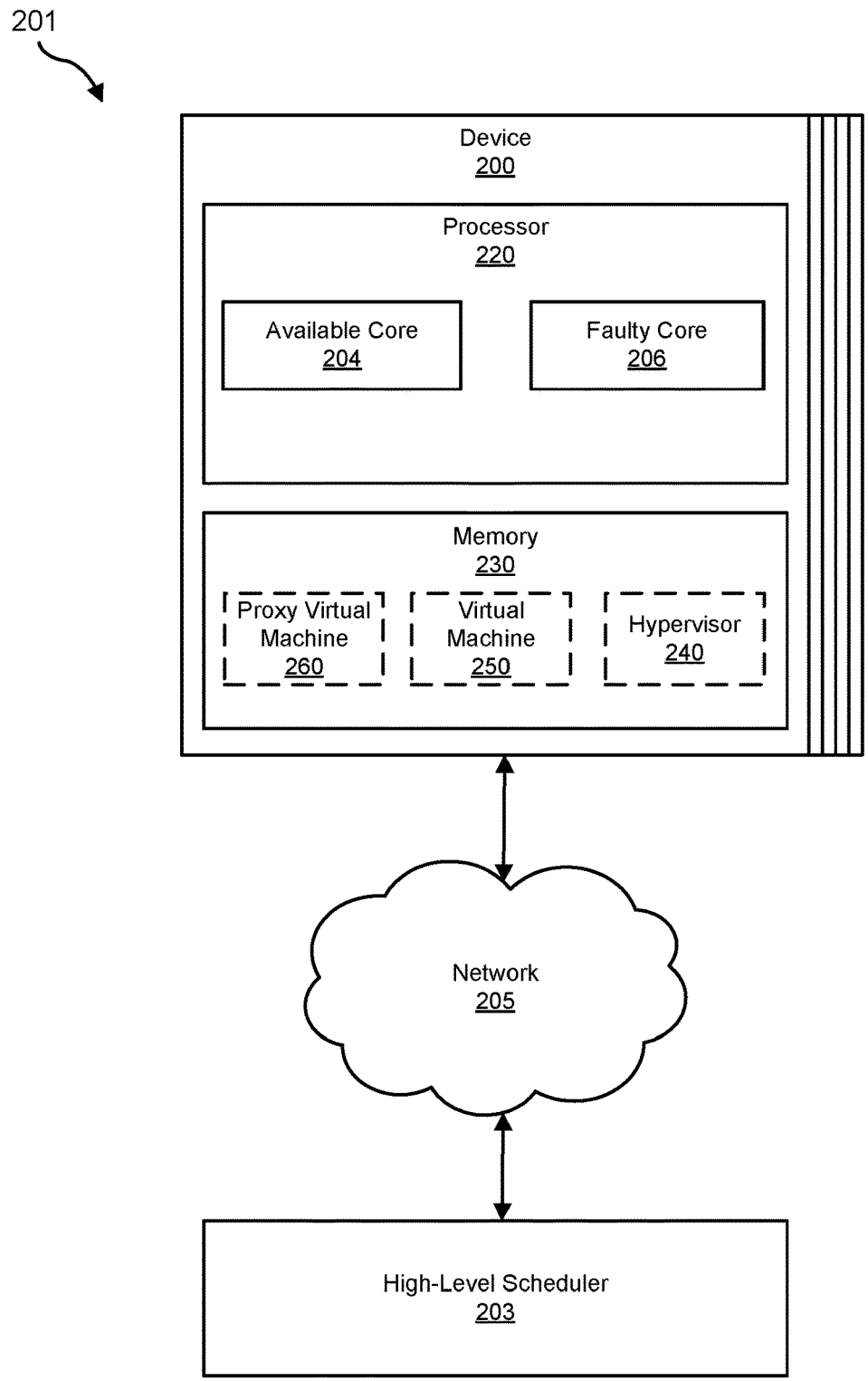
FIG. 2 is a block diagram of an exemplary system with multi-core devices.

FIG. 2 illustrates a system 201 that includes a device 200 and a high-level scheduler 203. System 201 corresponds to a data center, cloud computing environment, and/or content delivery network. Device 200 corresponds to device 100. Device 200 includes a processor 220 that corresponds to processor 120 and a memory 230 that corresponds to memory 130. Processor 220 further includes an available core 204 that corresponds to one or more instances of available core 104, and a faulty core 206 that corresponds to one or more instances of faulty core 106. Device 200 further includes hypervisor 240 that corresponds to one or more instances of hypervisor 140, proxy virtual machine 260 that corresponds to one or more instances of proxy virtual machine 160, and virtual machine 250 that corresponds to one or more instances of virtual machine 150.

A network 205 generally represents any medium or architecture capable of facilitating communication or data transfer. In one example, network 205 can facilitate communication between computing device 200 and high-level scheduler 203. In this example, network 205 can facilitate communication or data transfer using wireless and/or wired connections. Examples of network 205 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

As shown in FIG. 2, one or more instances of device 200 can be in communication with high-level scheduler 203 via network 205. High-level scheduler 203 corresponds to a manager that can manage multiple devices 200 for VM allocation in system 201 and coordinates with each respective hypervisor 240 of each device 200. High-level scheduler 203 corresponds to a scheduling model responsible for managing the allocation of computing resources (such as CPU and memory) from devices 200 in system 201 to VMs requesting such computing resources. In some examples, high-level scheduler 203 is tasked to create a new VM, then uses the scheduling model to select a device that has the available resources for the new VM.

High-level scheduler 203 relies on each hypervisor 240 to report the set of available cores within each respective device 200 to select the appropriate device for VM allocation. For instance, high-level scheduler 203 can select device 200 for the assignment of virtual machine 250 based on the availability of resources reported by hypervisor 240 and accordingly instruct hypervisor 240 to create virtual machine 250 on device 200. However, device 200 can include faulty cores (e.g., faulty core 206) that are reported as available for VM allocation. Therefore, hypervisor 240 can undesirably create and allocate a VM to one or more of the faulty cores on device 200. Fixing and/or removing the faulty core often requires shutting down device 200, which removes the functioning computing resources of device 200 from system 201.

Figure 3:
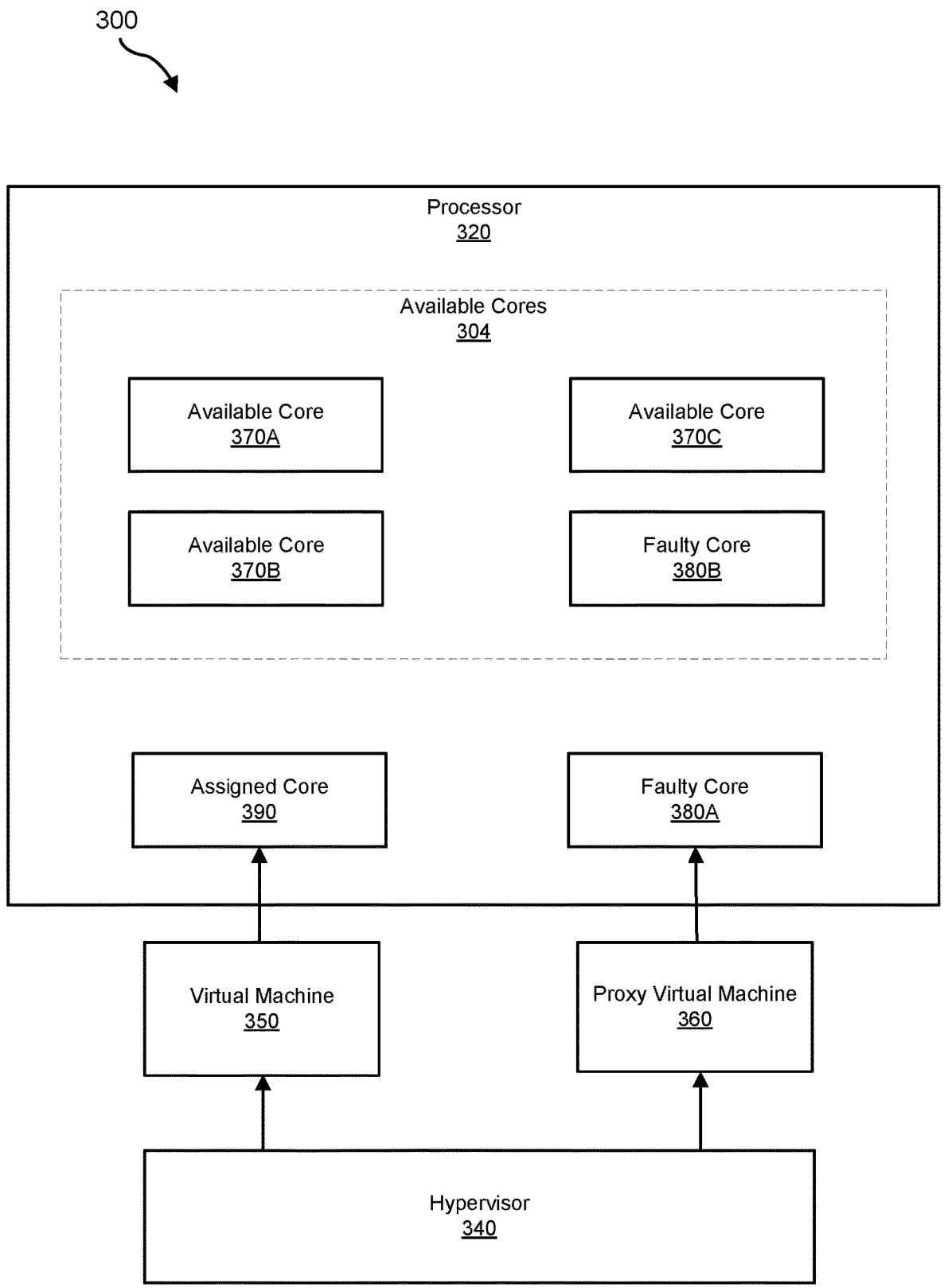
FIG. 3 is a block diagram of an additional exemplary multi-core device for virtual machine allocation.

The systems and methods described herein can allow disabling the faulty cores without shutting down device 200 or removing the faulty cores entirely, which can reduce an impact to the remaining cores on processor 220, for instance by allowing continued usage of the remaining cores. In some examples, hypervisor 240 can assign a proxy virtual machine 260 to a faulty core 206. FIG. 3 illustrates this feature of the hypervisor.

FIG. 3 illustrates a device 300 that corresponds to device 100. Device 300 includes processor 320 that corresponds to processor 220. Processor 320 further includes available cores 304 that correspond to various instances of available core 204, and faulty cores 380A and 380B that correspond to various instances of faulty core 206. As illustrated in FIG. 3, available cores 304 include an available core 370A, an available core 370B, an available core 370C, and an available faulty core 380B. As further illustrated in FIG. 3, the faulty cores include a faulty core 380A and a faulty core 380B.

The systems and methods described herein allow usage and management of physical processor cores via a hypervisor 340, while maintaining desired performance levels/thresholds of a number of processing cores. Hypervisor 340 corresponds to various instances of hypervisor 240 and/or hypervisor 140. In some examples, available cores 304 correspond to a number of cores available for VM assignment. Conversely, faulty cores 380A and 380B can correspond to a number of faulty cores that are considered undesirable for VM assignment.

In some examples, hypervisor 340 can manage availability of computing resources, including a set of available cores 304 that are available for assigning to a virtual machine and/or a proxy virtual machine. For instance, hypervisor 340 can assign a newly tasked virtual machine to one or more of the cores in available cores 304. Once assigning the core, hypervisor 340 can remove the assigned core from the set of available cores 304 (e.g. an assigned core 390 being assigned to a virtual machine 350) that are available for processing tasks.

However, hypervisor 340 can receive a faulty core status from a control circuit (e.g., control circuit 107, not shown in FIG. 3) that identifies faulty cores (e.g., faulty core 380A and faulty core 380B) of processor 320. In some examples, hypervisor 340 can assign faulty core 380B in available cores 304 to a VM, although this can be undesirable for overall performance of device 300. To remove faulty cores from available cores 304 without having to assign a tasked VM or otherwise implement a different signifier of unavailability, hypervisor 340 can instead assign proxy VMs to faulty cores. A proxy VM can correspond to a specialized VM deployed within a virtualization environment or a cloud infrastructure that can make one or more of the faulty cores invisible to a high-level scheduler (e.g. high-level scheduler 203) while minimizing an impact on performance.

In response to hypervisor 340 receiving a faulty core status for faulty core 380A, hypervisor 340 can assign proxy virtual machine 360 to faulty core 380A to remove faulty core 380A from the set of available cores 304, as illustrated in FIG. 3. In some examples, hypervisor 340 can assign proxy virtual machine 360 to faulty core 380A when faulty core 380A is available or otherwise not assigned to or associated with another VM (e.g., waiting for faulty core 380A to become available). In addition, to minimize the impact to a performance of device 300 as well as to reduce power consumption, hypervisor 340 can provide a minimal workload to proxy virtual machine 360. However, to prevent proxy virtual machine 360 from entering a deep sleep state, in some examples hypervisor 340 can provide a task to proxy virtual machine 360 to maintain an active state with the minimal workload or disable the deep sleep state of proxy virtual machine 360. In some examples, hypervisor 340 can disable one or more sleep modes (corresponding to sleep states including the deep sleep state) of proxy virtual machine 360 by sending commands to proxy virtual machine 360 or otherwise configuring proxy virtual machine 360. Hypervisor 340 can disable the deep sleep state of proxy virtual machine 360 when hypervisor 340 assigns proxy virtual machine 360 to faulty core 380A or at any point after the assignment of proxy virtual machine 360 to faulty core 380A. In other examples, hypervisor 340 can disable the deep sleep state of proxy virtual machine 360 in instances including but not limited to when hypervisor 340 detects when proxy virtual machine 360 is about to enter the deep sleep state, and/or when hypervisor 340 detects a history of proxy virtual machine 360 entering the deep sleep state. Further, hypervisor 340 can disable the deep sleep state of proxy virtual machine 360 when hypervisor 340 decides not to give proxy virtual machine 360 a task or when hypervisor 340 detects the minimal workload of proxy virtual machine 360 is idle.

Once hypervisor 340 assigns proxy virtual machines to the faulty cores, the faulty cores can be considered unavailable as resources for VM scheduling and allocation. However, the faulty cores can, in some instances, be useful to make available again as resources. In some implementations, a resource management policy can reuse faulty cores. The resource management policy refers to a policy responsible for optimizing the efficiency and effectiveness of physical cores on a processor. For instance, the control circuit can facilitate returning one or more of the faulty cores assigned to a proxy virtual machine back to the set of available cores 304, which can be based on the resource management policy. In some implementations, the resource management policy can maintain a balanced workload of the device across the cores of processor 320. For instance, the balanced workload of the device can include a threshold corresponding to a number of cores assigned to VMs compared to a number of available cores. After the workload of the device exceeds the threshold (e.g. the number of cores assigned to VMs exceeds the number of available cores, a threshold percentage of available cores out of all the cores, a remaining lifespan of cores, etc.) hypervisor 340 can terminate proxy virtual machine 360. Thus, faulty core 380B can be returned to the available cores 304.

In some examples, hypervisor 340 can assign an affinity for faulty core 380A to proxy virtual machine 360, for instance when assigning faulty core 380A to proxy virtual machine 360, although in other examples hypervisor 340 can assign the affinity in response to other events (e.g., proxy VM 360 entering a deep sleep state). The deep sleep state corresponds to a low power state in which hardware components can be powered down to reduce power consumption, which in the context of virtualized hardware for a VM, can result in releasing assigned computing resources. For example, proxy virtual machine 360 can enter the deep sleep state after proxy VM 360 no longer has any active tasks for a sufficient amount of time or after the minimal workload becomes idle. The deep sleep state can be undesirable, however, because proxy VM 360 will not require computing resources in the deep sleep state such that hypervisor 340 can return the core that was originally assigned to proxy VM 360 (e.g., faulty core 380A) back to the set of available cores 304. In some examples, disabling the deep sleep state of proxy VM 360 via hypervisor 340 is unavailable. For example, an administrative policy can prevent hypervisor 340 from disabling the deep sleep state of proxy VM 360, or hypervisor 340 can otherwise be unable to disable the deep sleep state of VMs. Thus, the assignment of the affinity can prevent or reduce a likelihood of faulty core 380A being assigned to a newly tasked VM. In some implementations, when proxy virtual machine 360 wakes up from the deep sleep state, the affinity can facilitate the assignment of proxy virtual machine 360 to the faulty core it was assigned prior to entering the deep sleep state (e.g., faulty core 380A).

Figure 4:
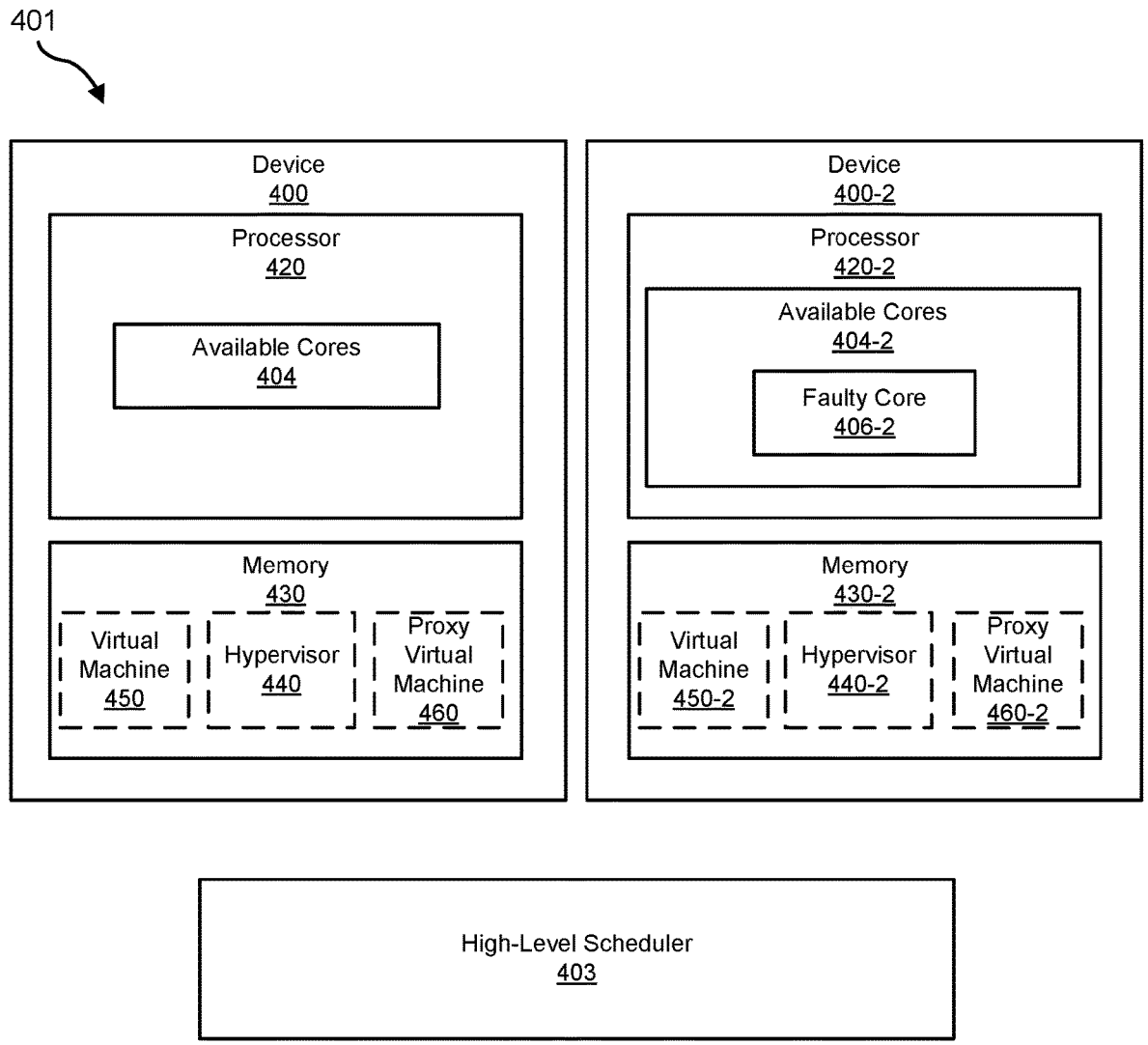
FIG. 4 is a block diagram of an additional exemplary system with multi-core devices.

FIG. 4 illustrates a system 401 that includes a device 400 and a device 400-2 each corresponding to device 300 and also each corresponding to separate instances of device 200 and/or device 100. System 401 corresponds to one or more instances of system 201. A processor 420 and a processor 420-2 can each correspond to instances of processor 320, processor 220, and/or processor 120. Memory 430 and memory 430-2 can correspond to instances of memory 230, and/or memory 130. A high-level scheduler 403 corresponds to high-level scheduler 203. Processor 420 includes available cores 404 that corresponds to available cores 304, available core 204, and/or available core 104. Processor 420-2 includes available cores 404-2 that corresponds to another instance of available cores 304, available core 204, and/or available core 104. Virtual machine 450 and virtual machine 450-2 can correspond to instances of virtual machine 350, virtual machine 250, and/or virtual machine 150.

As illustrated in FIG. 4, high-level scheduler 403 can be in communication with one or more devices (e.g., device 400/400-2). In each of device 400 and device 400-2, the respective hypervisor (e.g., hypervisor 440 and hypervisor 440-2) can report a respective set of available cores (e.g., available cores 404 and available cores 404-2) to high-level scheduler 403. High-level scheduler 403 can manage virtual machine allocation across one or more devices (e.g. device 400 and device 400-2) based on the reports provided by each respective hypervisor. For instance, hypervisor 440 can provide a report on the availability of available cores 404 to high-level scheduler 403 such that each of available cores 404 are visible to high-level scheduler 403 and available for virtual machine allocation. Similarly, in some examples, hypervisor 440-2 can provide a report of available cores 404-2, including faulty core 406-2, such that each of the available cores 404-2 and faulty core 406-2 are visible to the high-level scheduler 403 and available for virtual machine allocation.

Because faulty core 406-2 is not assigned to a proxy virtual machine, which in some examples can occur after a prior proxy virtual machine allocation is terminated, faulty core 406-2 can be visible to high-level scheduler 403. After a faulty core is no longer assigned to a proxy VM, it becomes visible such that high-level scheduler 403 can consider the faulty core as an available resource and select the corresponding device as a viable option for VM allocation. High-level scheduler 403 using the newly visible faulty core as a resource can result in reduced performance of a VM assigned to the faulty core. In some examples, device 400 depicts a device that includes physical processor cores (e.g. available cores 404) that are visible to high-level scheduler 403 without any visible faulty cores. The faulty cores invisible to high-level scheduler 403 are assigned to a proxy VM (e.g. proxy VM 460, and/or proxy VM 460-2).

Figure 5:
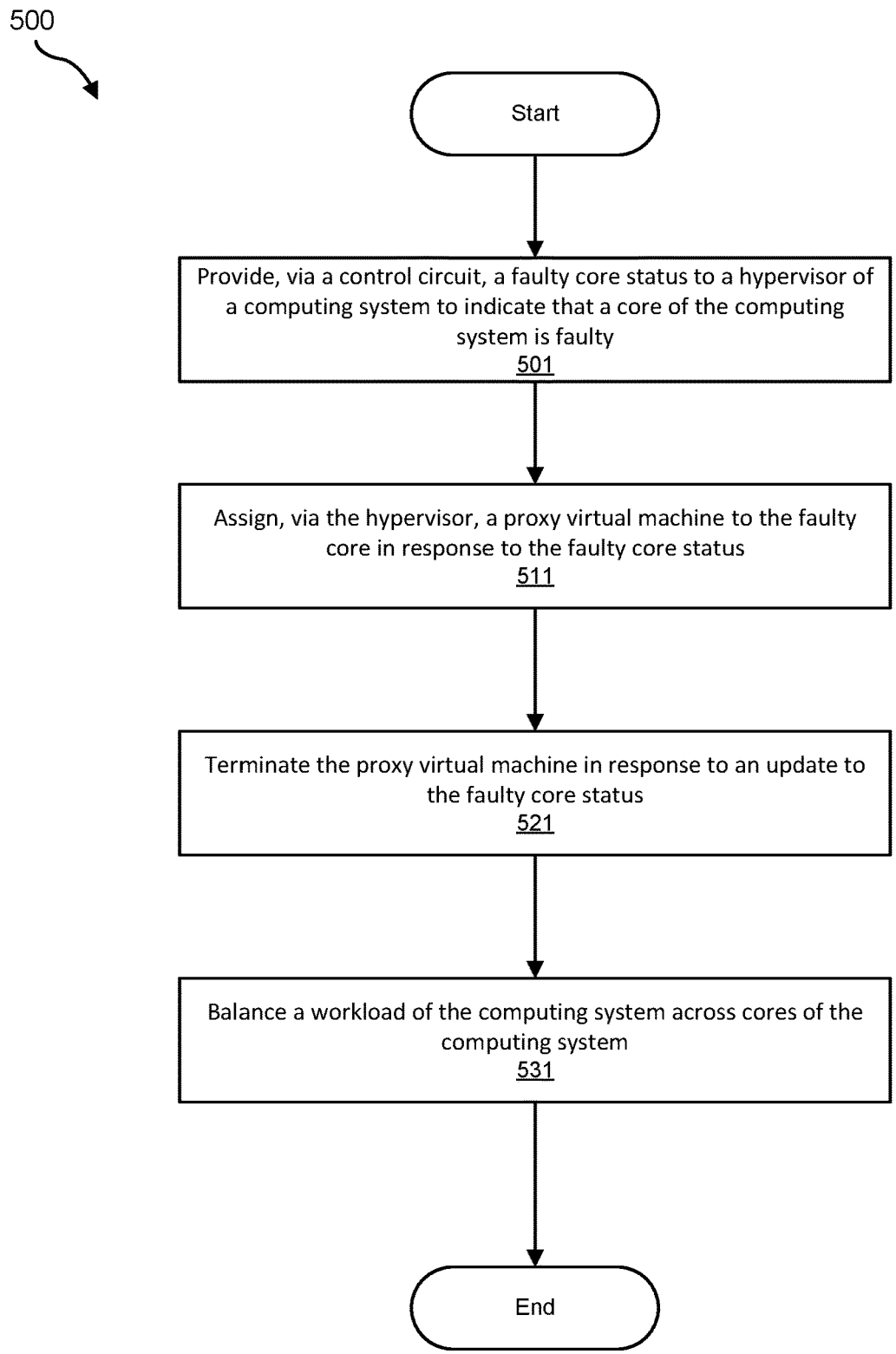
FIG. 5 is a flow diagram of an exemplary method for managing the system with multi-core devices.

FIG. 5 is a flow diagram of an example computer-implemented method 500 for managing a system with multicore devices. The steps shown in FIG. 5 can be performed by any suitable computer-executable code and/or computing device, including device 100 in FIG. 1, device 200 in FIG. 2, device 300 in FIG. 3, device 400 and device 400-2 in FIG. 4 and/or variations or combinations of one or more of the same. In one example, each of the steps shown in FIG. 5 can represent an algorithm whose structure includes and/or is represented by multiple sub-steps, examples of which will be provided in greater detail below.

As illustrated in FIG. 5, at step 501 one or more of the systems described herein can provide, via a control circuit, a faulty core status to a hypervisor of a computing system to indicate that a core of the computing system is faulty. For example, control circuit 107 can provide a faulty core status of faulty core 106 to hypervisor 140.

At step 511, one or more of the systems described herein assigns, via the hypervisor, a proxy virtual machine to the faulty core in response to the faulty core status. For example, hypervisor 140 can assign proxy virtual machine 160 to faulty core 106. In other examples, hypervisor 340 can assign proxy virtual machine 360 to faulty core 380A to remove it from the available cores (e.g., available cores 304). In further examples, hypervisor 340 can assign to proxy virtual machine 360, an affinity for the faulty core (e.g. faulty core 380A/380B), where the affinity biases availability of the faulty core to proxy virtual machine 360, which in some examples can be in response to proxy virtual machine 360 entering a deep sleep state. After proxy virtual machine 360 exits the deep sleep state, faulty core 380A can be reassigned to proxy virtual machine 360 based on the affinity.

In further examples, hypervisor 340 can maintain an active state of proxy virtual machine 360 by providing a task to proxy virtual machine 360 that comprises a minimal workload. Maintaining the active state of proxy virtual machine 360 can prevent proxy virtual machine 360 from entering the deep sleep state. Thus, maintaining the active state of proxy virtual machine 360 can obviate the need for using an affinity to reassign the faulty core to the proxy virtual machine 360.

At step 521, one or more of the systems described herein terminates the proxy virtual machine in response to an update to the faulty core status. For example, the hypervisor 140 can terminate the proxy virtual machine 160 in response to the update to the faulty core status from control circuit 107. In other examples, hypervisor 340 can return faulty core 380A to available cores 304 after terminating proxy virtual machine 360 in response to an update of a corresponding faulty core status.

At step 531, one or more of the systems described herein balances a workload of the computing system across cores of the computing system. For example, the hypervisor 340 can balance the workload of the computing system across available cores 304 of the computing system.

The systems described herein can perform step 531 in a variety of ways. In one example, hypervisor 340 can balance the workload of the computing system across available cores 304 via a resource management policy. For example, the workload of the computing device can include multiple physical processor cores assigned to one or more virtual machines, which reduces a number of cores available for virtual machine assignment. To compensate for the lack of available cores, hypervisor 340 can terminate a proxy virtual machine (e.g. proxy virtual machine 360) to return a previously assigned faulty core (e.g. faulty core 380B) to available cores 304. Thus, hypervisor 340 can increase the amount of available physical processor cores for VM assignment.

As explained above in connection with FIGS. 1-5, the systems and methods described herein can address the problems of intermittent errors for large scale data center customers. Large scale data centers can have multiple computing devices each with multiple physical processor cores that are configured to perform complex processing tasks. A virtual machine (VM) scheduling software (e.g. a high-level scheduler) can task virtual machines to each computing device for further assignment to physical processor cores. However, the physical processor cores can be prone to error and produce undesirable performance levels for the computing devices. The undesirable performance levels of the computing devices can stem from the aging of their respective physical processor cores, which can be monitored by a global manager. Furthermore, the increased aging of physical processor cores can directly affect the reliability of each physical process core.

In some examples, the reliability model of each physical processor core can follow a bathtub curve that predicts the effectiveness of the physical processor over time. The global manager is responsible for monitoring the lifespan of the physical processor cores and can gradually age the systems in place to avoid any additional burdens of reliability and keep the cores on the operational part of the bathtub curve. One way to address these physical processor errors is to remove problematic cores from consideration by allocating a proxy virtual machine, also referred to as a dummy virtual machine, onto the faulty cores to disallow the VM scheduling software from scheduling any other virtual machines on the faulty cores.

The virtual machine (VM) scheduling software operates in conjunction with a hypervisor to manage the VM allocation across multiple computing devices and the physical processor cores within each computing device. Once a core is considered problematic, the method of assigning a proxy virtual machine, as described herein, can avoid any operational shutdown for repairs or the removal of any computing devices to address the problematic core. In some examples, the operational shutdown of the computing device cannot be a viable option in cases where the system is a self-contained entity or sealed device (e.g. an immersion tank) and reasonable output from the system is required. The benefits from this method of VM allocation include reduced operation costs, more efficient resource and management allocations across multiple computing devices and reduced total cost of ownership (TCO). For example, removing one or more computing devices to address problematic cores increases the TCO particularly because the problematic cores are often intermittently faulty while other cores remain usable. An intermittently faulty core can still be utilized but can be flagged for repair, prematurely taking the computing device and its usable cores offline. Prematurely removing one or more computing devices incurs repair and/or replacement costs, thereby increasing the TCO. The systems and methods described herein can advantageously avoid such premature removal and related costs.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 101 in FIG. 1 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In various implementations, all or a portion of example system 101 in FIG. 1 can facilitate multi-tenancy within a cloud-based computing environment. In other words, the modules described herein can configure a computing system (e.g., a server) to facilitate multi-tenancy for one or more of the functions described herein. For example, one or more of the modules described herein can program a server to enable two or more clients (e.g., customers) to share an application that is running on the server. A server programmed in this manner can share an application, operating system, processing system, and/or storage system among multiple customers (i.e., tenants). One or more of the modules described herein can also partition data and/or configuration information of a multi-tenant application for each customer such that one customer cannot access data and/or configuration information of another customer.

According to various implementations, all or a portion of example system 101 in FIG. 1 can be implemented within a virtual environment. For example, the modules and/or data described herein can reside and/or execute within a virtual machine. As used herein, the term "virtual machine" generally refers to any operating system environment that is abstracted from computing hardware by a virtual machine manager (e.g., a hypervisor).

In some examples, all or a portion of example system 101 in FIG. 1 can represent portions of a mobile computing environment. Mobile computing environments can be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments can have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein can be provided for a mobile computing environment and/or can interact with a mobile computing environment.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using modules that perform certain tasks. These modules can include script, batch, or other executable files that can be stored on a computer-readable storage medium or in a computing system. In some implementations, these modules can configure a computing system to perform one or more of the example implementations disclosed herein.

The preceding description has been provided to enable others skilled in the art to best utilize various aspects of the example implementations disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
a processor;
a faulty core; and
a physical memory comprising computer-executable instructions that, when executed by the processor, cause the processor to execute a hypervisor that is configured to assign a proxy virtual machine to the faulty core;
wherein the proxy virtual machine comprises a minimal workload.

2. The device of claim 1, wherein the hypervisor is configured to manage a set of available cores of the device that are available for assigning to virtual machines.

3. The device of claim 2, wherein the hypervisor is configured to report the set of available cores of the device to a high-level scheduler.

4. The device of claim 2, wherein the hypervisor is configured to assign the proxy virtual machine to the faulty core to remove the faulty core from the set of available cores.

5. The device of claim 2, wherein the hypervisor is configured to terminate the proxy virtual machine to return the faulty core to the set of available cores.

6. The device of claim 5, wherein the hypervisor is configured terminate the proxy virtual machine to balance a workload of the device across the set of available cores.

7. The device of claim 5, wherein the hypervisor is configured to terminate the proxy virtual machine in response to receiving a faulty core status that indicates the faulty core is not faulty.

8. The device of claim 1, wherein the hypervisor is configured to provide a task to the proxy virtual machine to maintain an active state of the proxy virtual machine.

9. The device of claim 1, wherein the hypervisor assigns, to the proxy virtual machine, an affinity for the faulty core to bias an availability of the faulty core to the proxy virtual machine, via the affinity, when the proxy virtual machine enters a deep sleep state.

10. The device of claim 1, wherein the hypervisor is configured to disable a deep sleep state of the proxy virtual machine.

11. A system comprising:
    a computing device comprising a hypervisor that is configured to report a set of available cores to a high-level scheduler that is configured to manage virtual machine allocation on the computing device based on the reported set of available cores wherein:
    the computing device comprises a processor for executing the hypervisor and a faulty core; and
    the hypervisor of the computing device is configured to assign a proxy virtual machine to the faulty core.

12. The system of claim 11, wherein the hypervisor of the computing device is configured to terminate the proxy virtual machine to:
    return the faulty core to the set of available cores; and
    balance a workload of the computing device across the set of available cores.

13. The system of claim 12, wherein the hypervisor of the computing device is further configured to terminate the proxy virtual machine in response to receiving a faulty core status that indicates the faulty core is not faulty.

14. The system of claim 12, wherein the hypervisor of the computing device is configured to prevent a deep sleep state of the proxy virtual machine by providing a task or disabling the deep sleep state of the proxy virtual machine.

15. The system of claim 12, wherein the hypervisor of the computing device is configured to assign, to the proxy virtual machine, an affinity for the faulty core from the set of available cores to bias an availability of the faulty core from the set of available cores to the proxy virtual machine when the proxy virtual machine enters a deep sleep state.

16. The system of claim 12, wherein the hypervisor of the computing device is configured to remove the faulty core from the set of available cores of the computing device by assigning the proxy virtual machine to the faulty core.

17. A computer-implemented method comprising:
    providing, via a control circuit, a faulty core status to a hypervisor of a computing system to indicate that a core of the computing system is faulty;
    assigning, via the hypervisor, a proxy virtual machine to the faulty core in response to the faulty core status;
    terminating the proxy virtual machine in response to an update to the faulty core status; and
    balancing a workload of the computing system across cores of the computing system.

18. The computer-implemented method of claim 17, comprising disabling a deep sleep state of the proxy virtual machine via the hypervisor.

19. The computer-implemented method of claim 17, further comprising maintaining an active state of the proxy virtual machine, via the hypervisor, by providing a task to the proxy virtual machine comprising a minimal workload.

20. The computer-implemented method of claim 17, comprising reporting, via the hypervisor, a set of available cores of the computing system to a high-level scheduler, wherein:
    the hypervisor assigns the proxy virtual machine to the faulty core to remove the faulty core from the set of available cores of the computing system; and
    the hypervisor terminates the proxy virtual machine to return the faulty core to the set of available cores.

* * * * *